(12) United States Patent
Hanna

(10) Patent No.: US 12,547,512 B2
(45) Date of Patent: Feb. 10, 2026

(54) TESTING FOR MEMORY DEVICES USING DEDICATED COMMAND AND ADDRESS CHANNELS

(71) Applicant: Micron Technology, Inc., Boise, ID (US)

(72) Inventor: Stephen Hanna, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 65 days.

(21) Appl. No.: 18/581,189

(22) Filed: Feb. 19, 2024

(65) Prior Publication Data

US 2024/0281350 A1    Aug. 22, 2024

Related U.S. Application Data

(60) Provisional application No. 63/447,554, filed on Feb. 22, 2023.

(51) Int. Cl.
*G06F 11/263* (2006.01)
(52) U.S. Cl.
CPC .................. *G06F 11/263* (2013.01)
(58) Field of Classification Search
CPC ...................................... G06F 11/263
USPC ........................................... 714/719
See application file for complete search history.

(56) References Cited

U.S. PATENT DOCUMENTS

| | | | |
|---|---|---|---|
| 6,738,881 B1* | 5/2004 | Ollivier | G06F 13/28 370/329 |
| 6,813,249 B1* | 11/2004 | Lauffenburger | H04L 47/28 370/412 |
| 7,071,679 B1* | 7/2006 | Sabih | G06F 11/263 324/762.02 |
| 2005/0152197 A1* | 7/2005 | Cho | H04N 23/63 348/E5.042 |
| 2006/0039284 A1* | 2/2006 | Zhai | H04L 49/90 370/235 |
| 2017/0053711 A1* | 2/2017 | Shibata | G11C 29/56012 |
| 2017/0285941 A1* | 10/2017 | Nale | G06F 13/16 |
| 2020/0309833 A1* | 10/2020 | Yaguchi | G06F 3/0659 |
| 2023/0205435 A1* | 6/2023 | Murphy | G06F 3/0604 711/154 |

\* cited by examiner

*Primary Examiner* — James C Kerveros
(74) *Attorney, Agent, or Firm* — Holland & Hart LLP

(57) ABSTRACT

Methods, systems, and devices for improved testing for memory devices using dedicated command and address (CA) channels are described. A memory system associated with the memory devices may include a buffer configured to store a channel select indicator that indicates which CA channel to be utilized for various access commands associated with the memory devices. The memory system may utilize headers to facilitate the data transfers between the associated memory devices and testing system via the indicated CA channel using the buffer. The memory system may detect a select chip enable command on the CA channel and may subsequently store the channel select indicator in the buffer. The memory system may then detect data on the dedicated CA channel and subsequently read the stored channel select indicator from the buffer. The memory system may then erase the channel select indicator from the buffer, after receiving a select chip terminate command.

20 Claims, 6 Drawing Sheets

| Cycle Type | First Unit Interval Header 320 | | Second Unit Interval Header 325 | |
|---|---|---|---|---|
| | CA1 | CA0 | CA1 | CA0 |
| Data Output 350 | 0 | 0 | 0 | 0 |
| Data Input 355 | 0 | 0 | 1 | 0 |
| Address 360 | 0 | 1 | 0 | 0 |
| Command 365 | 1 | 0 | 0 | 0 |
| LUN Select 370 | 1 | 1 | 0 | 0 |
| Select Chip Enable 375 | 1 | 1 | 0 | 1 |
| Select Chip Disable 380 | 1 | 1 | 1 | 0 |
| Select Chip Terminate 385 | 1 | 1 | 1 | 1 |

TESTING FOR MEMORY DEVICES USING DEDICATED COMMAND AND ADDRESS CHANNELS

CROSS REFERENCE

The present application for patent claims the benefit of U.S. Provisional Patent Application No. 63/447,554 by HANNA et al., entitled "IMPROVED TESTING FOR MEMORY DEVICES USING DEDICATED COMMAND AND ADDRESS CHANNELS," filed Feb. 22, 2023, assigned to the assignee hereof, and expressly incorporated by reference in its entirety herein.

TECHNICAL FIELD

The following relates to one or more systems for memory, including improved testing for memory devices using dedicated command and address channels.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
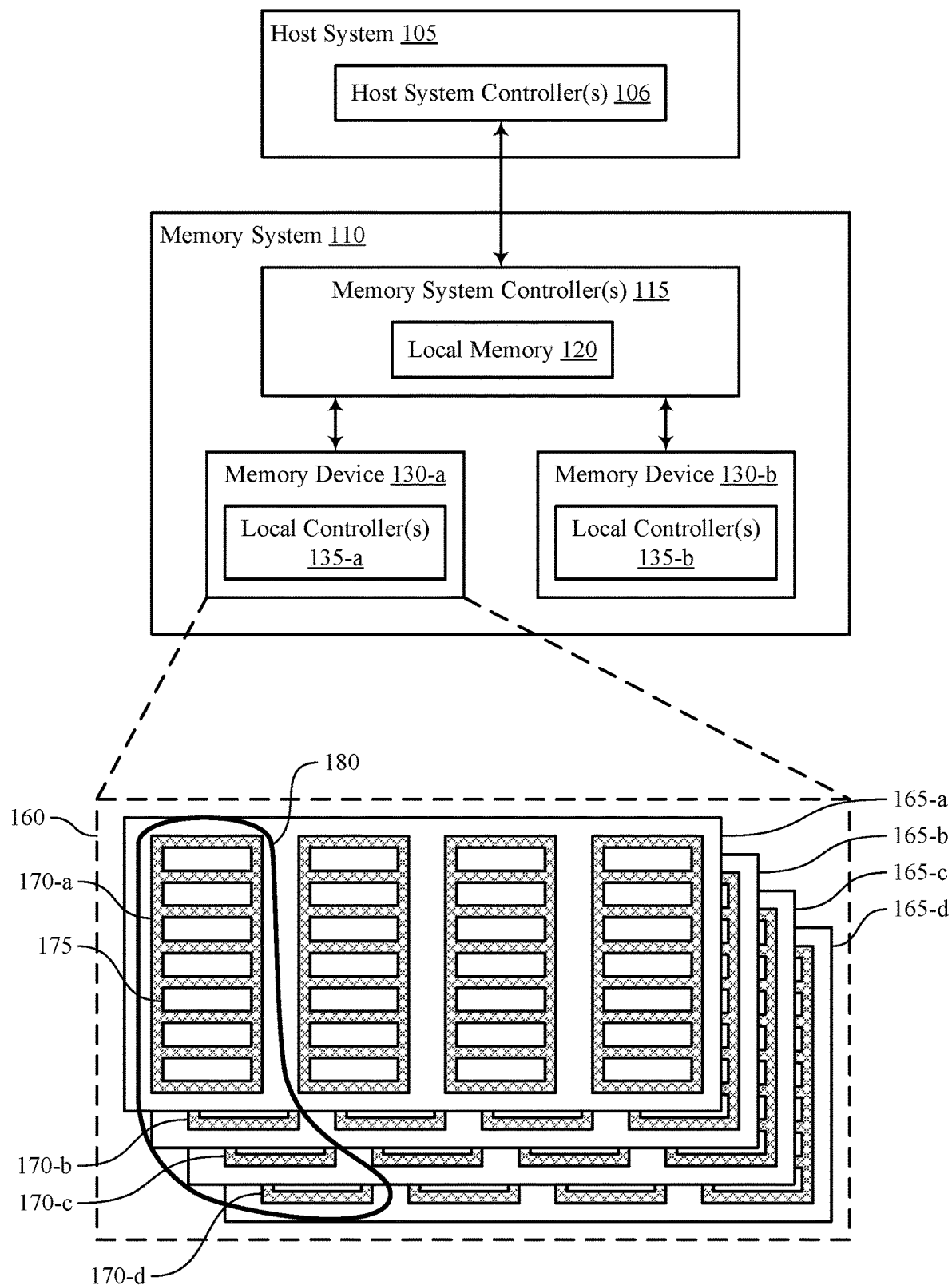
FIG. 1 illustrates an example of a system that supports improved testing for memory devices using dedicated command and address channels in accordance with examples as disclosed herein.

Memory systems may be used to store data for computing systems. These memory systems may use communication protocols—such as open NAND flash interface (ONFI)—to communicate with its various host systems. During manufacturing of the memory system, it may be helpful to test aspects of the memory system while bypassing the standard communication interfaces. In some cases, the communication protocols—such as ONFI—may include channels dedicated as command/address channels.

A system may include a memory system and a test system coupled with the memory system via various input and output pins (e.g., I/O pins). In some examples, memory devices (e.g., non-AND (NAND) memory devices) associated with the memory system may communicate signals and commands with the test system via these I/O pins to test the performance of operations—e.g., access operations including read, write, and reset operations. In some cases, the components of the memory system used to mimic the functionality of the primary communication channels during testing may be referred to as pass through mode components. In some examples, one or more of the I/O pins may be dedicated to command and address (CA) information which may enable asynchronous communication of control information and data between the test system and the memory devices. In some examples, it may be difficult to test the signals communicated by the memory devices because of this asynchronous communication. Thus, techniques for testing a memory system and associated memory devices which utilizes dedicated CA channels may be beneficial.

Systems, devices, and techniques are described herein for testing memory devices (e.g., NAND memory devices) using pass through mode components to replicate the functionality of dedicated CA channels to communicate commands. In some examples, the pass through mode components of the memory system associated with the memory devices may include a buffer. This buffer may be configured to store a channel select indicator that indicates which CA channel to be utilized for various access commands associated with the memory devices. A buffer to store commands may be useful because the commands may be communicated asynchronously from the data associated with a respective command. Thus, the buffer may store the commands until the data associated with the command is ready to communicate. In some examples, the memory system may utilize headers on the CA channel to identify commands and to facilitate the data transfers between the associated memory devices and testing system via. For example, the memory system may detect a select chip enable command (using a header) on the CA channel and may subsequently store the channel select indicator in the buffer. In some examples, the memory system may then detect data (e.g., a data burst) on the dedicated CA channel. In response to this data burst detection, the memory system may read the stored channel select indicator from the buffer. In some examples, the memory system may subsequently detect a select chip terminate command on the dedicated CA channel and, in response to which, the memory system may erase the channel select indicator from the buffer. Accordingly, the incorporation of a buffer into the pass through mode components of the memory system may enable the testing of dedicated CA channels and may translate into reduced testing time per device and an increase in overall efficiency.

In addition to applicability in memory systems as described herein, techniques for improved testing for memory devices using dedicated command and address channels may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating better performance through improved testing for memory devices using dedicated command and address channels.

Figure 2:
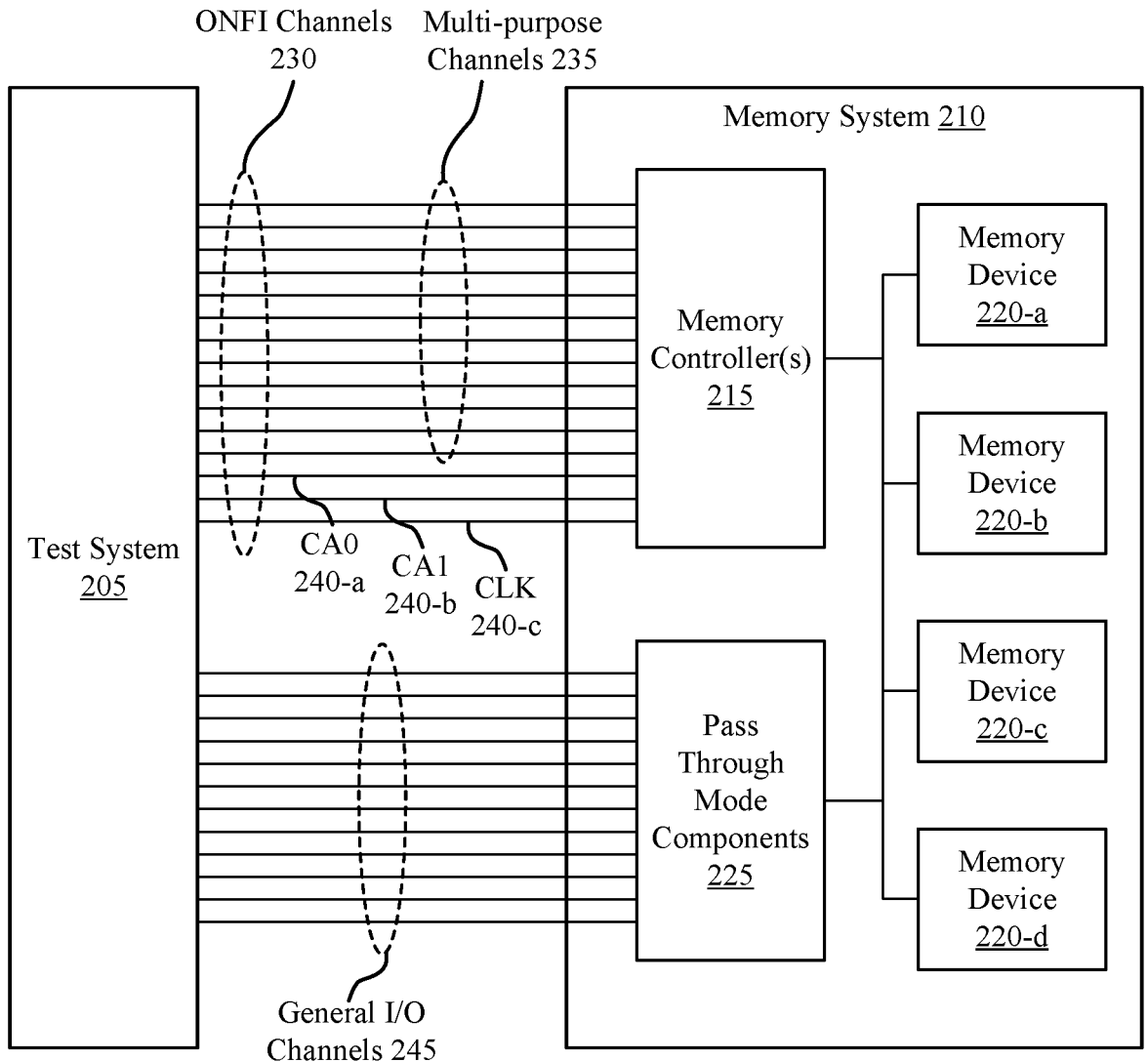
FIG. 2 illustrates an example of a system that supports improved testing for memory devices using dedicated command and address channels in accordance with examples as disclosed herein.

Features of the disclosure are initially described in the context of systems, devices, and circuits with reference to FIGS. 1 and 2. Features of the disclosure are described in the context of a timing diagram, headers, and a system with reference to FIGS. 3A through 4. These and other features of the disclosure are further illustrated by and described in the context of an apparatus diagram and flowchart that relate to improved testing for memory devices using dedicated command and address channels with reference to FIGS. 5 and 6.

FIG. 1 illustrates an example of a system 100 that supports improved testing for memory devices using dedicated command and address channels in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with one or more host system controllers 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), one or more memory controllers (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between one or more host system controllers 106 of the host system 105 and one or more memory system controllers 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support improved testing for memory devices using dedicated command and address channels. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Systems, devices, and techniques are described herein for testing the memory devices 130 that use dedicated CA channels to communicate commands. In some examples, pass through mode components of the memory system 110 associated with the memory devices 130 may include a buffer. This buffer may be configured to store a channel select indicator that indicates which CA channel to be utilized for various access commands associated with the memory devices 130. In some examples, the memory system 110 may utilize headers to facilitate the data transfers between the associated memory devices 130 and testing system via the indicated CA channel using the buffer. For example, the memory system 110 may detect a select chip enable command on the CA channel and may subsequently store the channel select indicator in the buffer. In some examples, the memory system 110 may then detect data (e.g., a data burst) on the dedicated CA channel. In response to this data burst detection, the memory system 110 may read the stored channel select indicator from the buffer. In some examples, the memory system 110 may subsequently detect a select chip terminate command on the dedicated CA channel and, in response to which, the memory system 110 may erase the channel select indicator from the buffer. Accordingly, the incorporation of a buffer into the testing of memory devices that use dedicated CA channels may translate into reduced testing time per device and an increase in overall efficiency.

FIG. 2 illustrates an example of a system 200 that supports improved testing for memory devices using dedicated command and address channels in accordance with examples as disclosed herein. The system 200 may be an example of a system 100 as described with reference to FIG. 1, or aspects thereof. The system 200 may include a memory system 210 configured to store data received from the test system 205 and to send data to the test system 205, if requested by the test system 205 using access commands (e.g., read commands or write commands). The system 200 may implement aspects of the system 100 as described with reference to FIG. 1. For example, the memory system 210 and the test system 205 may be examples of the memory system 110 and the host system 105, respectively.

The memory system 210 may include one or more memory devices 220 to store data transferred between the memory system 210 and the test system 205 (e.g., in response to receiving access commands from the test system 205). The memory devices 220 may include one or more memory devices as described with reference to FIG. 1. For example, the memory devices 220 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a memory controller 215 for controlling the transfer of data between a host system and the memory devices 220 during normal operations (e.g., for storing data, for retrieving data, for determining memory locations in which to store data and from which to retrieve data). The memory controller 215 may communicate with memory devices 220 directly or via a bus (not shown), which may include using a protocol specific to each type of memory device 220. In some cases, a single memory controller 215 may be used to control multiple memory devices 220 of the same or different types. In some cases, the memory system 210 may include multiple memory controllers 215 (e.g., a different memory controller 215 for each type of memory device 220, not shown). In some cases, a memory controller 215 may implement aspects of a local controller 135 as described with reference to FIG. 1.

The memory system 210 may include one or more interfaces for communicating with outsides systems—such as host systems and testing systems. In some cases, one example of the interface may be an ONFI interface. The memory system 210 may include an interface for communication of data between the test system 205 and the memory devices 220. This interface, in conjunction with the memory controller 215, may support communication of data between the test system 205 and the memory devices 220 during normal operations. For example, the interface may be coupled with various inputs and outputs of ONFI channels 230 that support the transfer of various signals between the memory system 210 (and the associated memory devices 220) and the test system 205. In some cases, a quantity of the ONFI channels 230 may be dedicated as general or multi-purpose channels 235. For example, these multi-purpose channels 235 may be utilized to transfer data bus signals, various control signals relating to the type of bus associated with the interface, indications of access operations, control signals for data transfers, or a combination of such.

In some examples, commands and data may be communicated over the ONFI channels 230 in a synchronous manner—such that a command and its associated data are communicated with fixed time references relative to one another. In some examples, a quantity of the ONFI channels 230 may be specifically dedicated to communicating CA (command/address) information. For example, instead of all of the ONFI channels 230 being dedicated as general input and outputs, one or more of the ONFI channels 230 may be dedicated as a CA0 240-a, a CA1 240-b, a CE, and a clock signal 240-c (e.g., CA channels, a chip enable channel, a CA clock channel, respectively). Such configurations may enable asynchronous communication of control information and data—such that a command and its associated data may be communicated with reference to any timing constraints between communicating the control information and the data. In some examples, dedicating these ONFI channels to CA information may allow for a more direct transfer of commands to the memory devices 220. For example, the test system 205 may toggle (e.g., activate) the clock signal 240-c and subsequently transfer a desired command on one or both of the CA0 240-a and the CA1 240-b channels. In the case that the CA0 240-a and the CA1 240-b channels are shared by all of the memory devices 220, any of the memory devices 220 that has been enabled (e.g., activated) may decode the command.

The memory system 210 may also include pass through mode components 225 for communicating data between the test system 205 and the memory devices 220. In some examples, the pass through mode components 225 may be examples of hardware (e.g., one or more multiplexers) associated with circuitry of the memory system 210 (e.g., associated with a controller die of the memory system 210, associated with a component separate from the controller die of the memory system 210). The multiplexers may be controlled to route traffic between different interfaces based on the control signals sent to the multiplexers. However, in some examples, the pass through components 225 may be examples of one or more controllers associated with firmware of the memory system 210. These pass through mode components 225 may be configured to bypass the memory controller 215 during testing operations (e.g., may support direct communication of data between the test system 205 and the memory devices 220 during testing operations). For example, the pass through mode components 225 may be coupled with various inputs and outputs in the form of general purpose input/output (GPIO) channels 245 that support the transfer of various signals directly between the test system 205 and the memory devices 220. In some examples, the test system 205 may utilize these GPIO channels 245 to support direct testing of the memory device 220 but may not utilize these GPIO channels 245 (and associated pass through mode components 225) during non-testing (e.g., normal) operations. As such, direct connection between the test system 205, the memory system 210, and the associated memory devices 220 may be beneficial.

In some examples, the pass through mode components 225 of the memory system 210 associated with the memory devices 220 may include a buffer. This buffer may be configured to store a channel select indicator that indicates which CA channel (e.g., CA0 240-a, CA1 240-b) to be utilized for various access commands associated with the memory devices 220. In some examples, the memory system 210 may utilize headers to facilitate the data transfers between the associated memory devices 220 and the test system 205 via the indicated CA channel using the buffer. For example, the memory system 210 may detect a select chip enable command on a CA channel and may subsequently store the channel select indicator in the buffer. In some examples, the memory system 210 may then detect data (e.g., a data burst) on the dedicated CA channel. In response to this data burst detection, the memory system 210 may read the stored channel select indicator from the buffer. In some examples, the memory system 210 may subsequently detect a select chip terminate command on the dedicated CA channel and, in response to which, the memory system 210 may erase the channel select indicator from the buffer. Accordingly, the incorporation of a buffer into the testing of the memory devices 220 that use dedicated CA channels may translate into reduced testing time per device and an increase in overall efficiency of the testing operation.

Figures 3A, 3B:
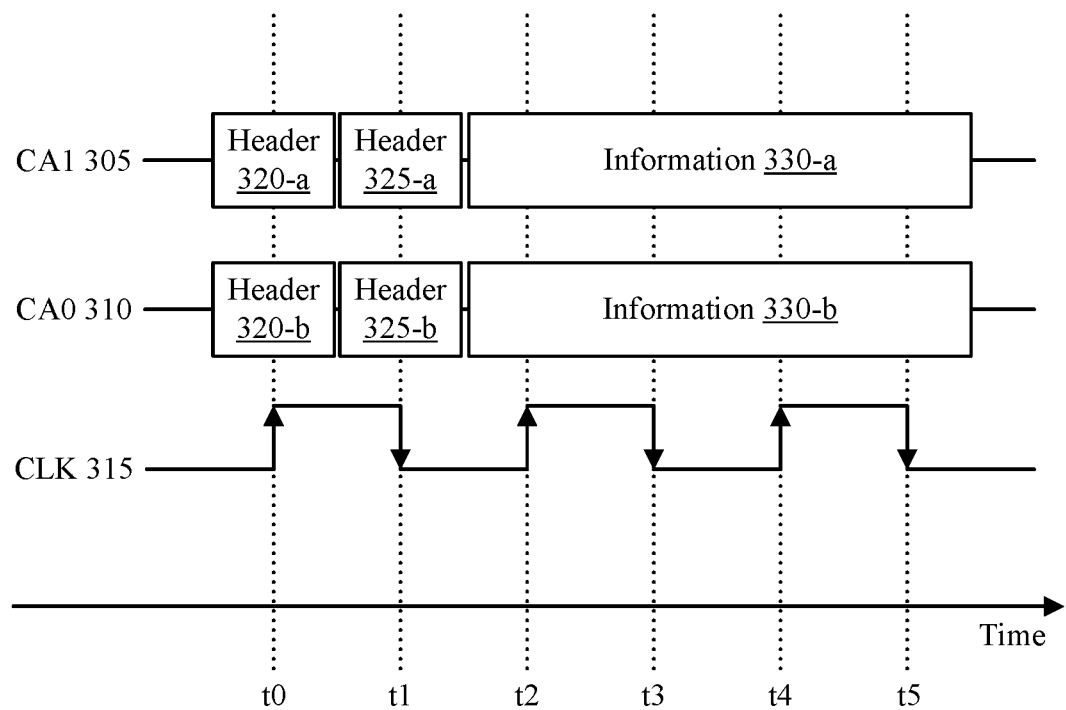
FIG. 3A illustrates an example of a timing diagram that supports improved testing for memory devices using dedicated command and address channels in accordance with examples as disclosed herein.
FIG. 3B illustrates an example of headers that support improved testing for memory devices using dedicated command and address channels in accordance with examples as disclosed herein.

FIGS. 3A and 3B illustrate examples of a timing diagram 300-a and headers 300-b that support improved testing for memory devices using dedicated command and address channels in accordance with examples as disclosed herein. The timing diagram 300-a illustrates the use of headers 320 and 325 and information 330 to communicate commands over dedicated CA channels 305 and 310. the features of the timing diagram 300-a may be executed by the system 100 or the system 200 as described with reference to FIGS. 1 and 2, or aspects thereof. The timing diagram 300-a illustrates one or more CA channels (e.g., a CA1 305 and a CA0 310) which may transfer various information and headers, as detailed by the associated headers 300-b. The headers 320 and 325 and the information 330 may be an example of a modified ONFI protocol that uses dedicated CA channels. The timing diagram 300-a may also illustrate a CA clock (e.g., clock signal 315) associated with the transmitting of the information 330 and associated headers 320 and 325. The timing diagram 300-*a* may implement aspects of the system 200 as described with reference to FIG. 2. For example, the CA1 305 and the CA0 310 may be examples of the CA1 240 *b* and the CA0 240-*a*, respectively, and the clock signal 315 may be an example of the clock signal 240-*c*.

FIG. 3A illustrates an example of a timing diagram 300-*a* that implements a modified ONFI protocol that supports improved testing for memory devices using dedicated command and address channels in accordance with examples as disclosed herein. The timing diagram 300-*a* may illustrate an example of an information transmission between a host (e.g., test) system and one or more memory devices. For example, the timing diagram 300-*a* may include the CA1 305 and the CA0 310 channels, over which the test system may pass information. The test system may transmit one or more headers (e.g., headers 320 and headers 325) over the CA1 305, the CA0 310, or a combination of both, followed by information 330 (e.g., information 330-*a*, information 330-*b*) related to each header, respectively. These headers may identify commands and may be used by the memory system to determine how to decode the information 330 that follows after the header.

In some examples, the test system may transmit data using a DDR unit interval. For example, the test system may transmit the headers 320, the headers 325, and the associated information 330 via the CA1 305 or the CA0 310, according to a DDR unit interval. In such cases, the testing system may transmit the headers 320 in accordance with a rising edge, that may be an example of a first unit interval and may transmit the headers 325 in accordance with a falling edge, that may be an example of a second unit interval. The test system may subsequently transmit the associated information 330 via the CA1 305, the CA0 310, or both, respectively.

FIG. 3B illustrates an example of headers 300-*b* that supports improved testing for memory devices using dedicated command and address channels in accordance with examples as disclosed herein. The headers 300-*b* may illustrate an example of headers transmitted between a host (e.g., test) system and one or more memory devices. The headers 300-*b* may be transmitted by the system 100 or the system 200, as part of the modified ONFI protocol as described with reference to FIGS. 1, 2, and 3A. For example, the test system may transmit one or more headers over the CA1, the CA0, or a combination of both, on a rising edge of a clock signal 315 (e.g., a first unit interval header 320) or a falling edge of the clock signal 315 (e.g., a second unit interval header 325). The test system may transmit information over the CA1 or the CA0 (which may be examples of CA1 305 and CA0 310 with reference to FIG. 3A) after transmitting one or more of the first unit interval header 320 or the second unit interval header 325.

In some examples, a memory system associated with the memory devices may include a buffer. This buffer may be an example of a first-in-first-out (FIFO) data structure configured to store and release (according to the headers) an indication of which CA channel to utilize. For example, the memory system may receive an indicator (e.g., a channel select indicator) of which CA channel to utilize. The memory system (e.g., the memory controller) may subsequently detect a select chip enable 375 command and may store the channel select indicator in the buffer in response. In some examples, the memory system may detect data (e.g., a data burst) on the selected channel, and may subsequently read the stored channel select indicator from the buffer. In some examples, the memory system may subsequently detect a select chip terminate 385 command and, in response to which, the memory system may erase the channel select indicator from the buffer.

The buffer may utilize the FIFO data structure because of the relative positions of commands and data being communicated on the CA channels and the data channels. While the commands may be communicated asynchronously relative to the data associated with the commands, the order with which the commands are communicated and the order with which the data is communicated may be the same. Thus, a buffer with FIFO data structure may be configured to store information associated commands until the data is read to be communicated.

Different information and commands may be communicated across the dedicated CA channels 305 and 310. Each of the different information types and commands may utilize different information. A header may be used in the communication protocol to enable the receiver to decode the information that follows the header. For example, the receiver (e.g., the memory system) may decode the header (e.g., headers 320-*a*, 320-*b*, 325-*a*, and 325-*b*) and then may alter how it decodes (e.g., interprets) the information that follows the header (e.g., information 330-*a* and 330-*b*). In some examples, different headers may be used to indicate information about the clock cycle in relation to the memory system and buffer. For example, a data output 350 and a data input 355 header may indicate to the memory system that a data transfer may occur. Similarly, an address 360 header and a command 365 header may indicate information regarding the CA bus, and a LUN select 370 header may indicate information concerning the logic unit of the memory system. As described herein, the select chip enable 375 header may activate (e.g., enable) chip select lines and enable a data transfer, and the select chip disable 380 header may similarly deactivate chip select lines and pause the data transfer. Additionally, the select chip terminate 385 header may trigger the erasure of the channel select indicator from the buffer and terminate the data transfer.

Figure 4:
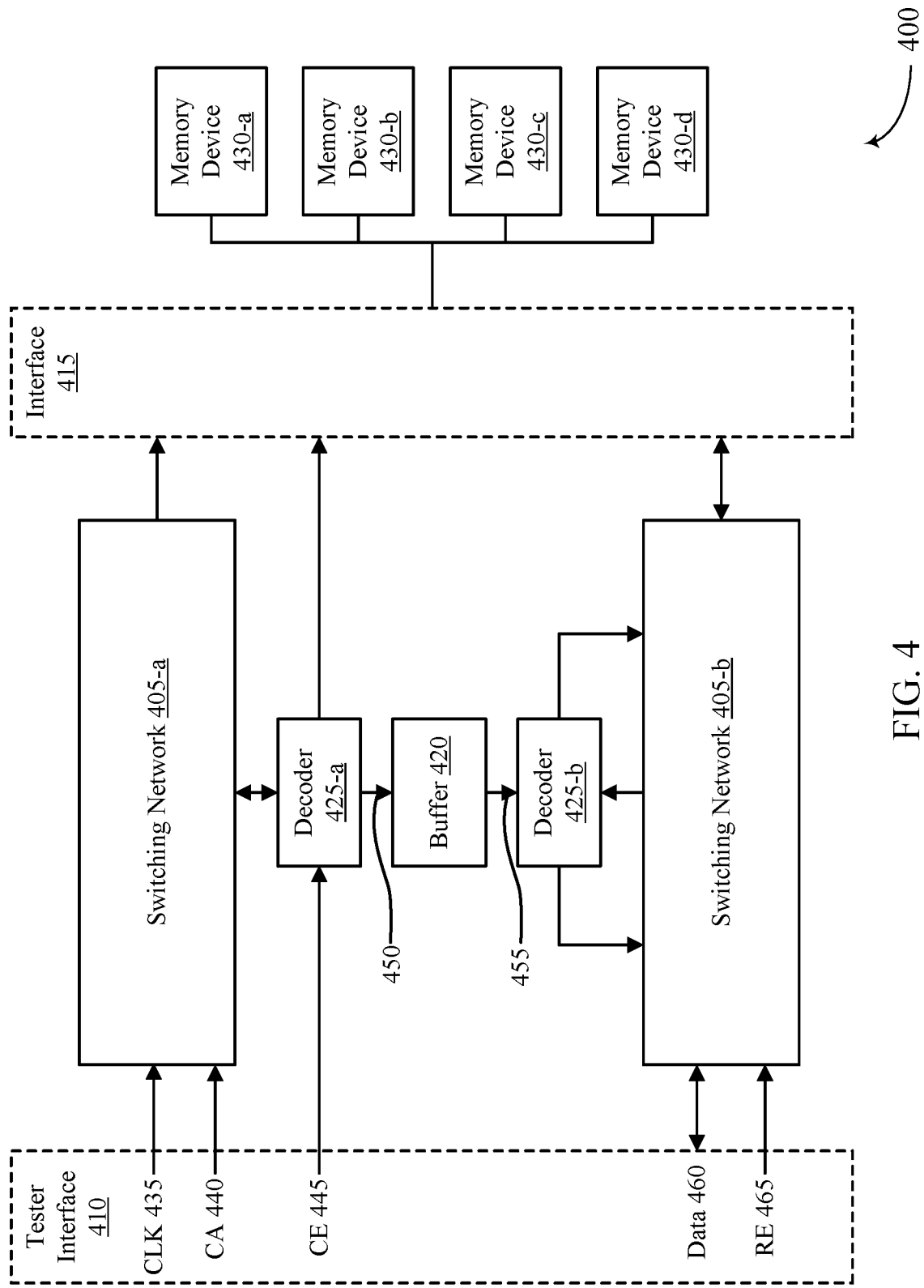
FIG. 4 illustrates an example of a system that supports improved testing for memory devices using dedicated command and address channels in accordance with examples as disclosed herein.

FIG. 4 illustrates an example of a system 300 that supports improved testing for memory devices using dedicated command and address channels in accordance with examples as disclosed herein. The system 400 may be an example of a system 100 or system 200, as described with reference to FIG. 1 or 2, or aspects thereof. The system 400 may include switching networks 405 configured to route data and commands between a tester interface 410 associated with a test system and an interface 415 associated memory devices 430. The test system and the memory devices 430 may be examples of the test system 205 and the memory devices 220, respectively. The system 400 may include a clock signal 435 (e.g., a CA clock) received over a CLK pin and that is used to clock the commands received over the CA pins. The CLK signal may be an example of the clock signal 240-*c* and the clock signal 315 described with reference to FIGS. 2 and 3A. The system 400 may also include a CA 440 signal used to communicate commands to the memory system. The CA 440 signal may be communicated over one or more pins or channels, which may be examples of the CA1 240-*b*, the CA0 240-*a*, the CA1 305, or the CA0 310, with reference to FIGS. 2 and 3A. The system 400 may also include a CE 445 (e.g., a chip enable) used to indicate to a buffer 420 and interface 415 which of the memory devices 430 associated data may be routed to.

The system 400 may include the switching network 405-*a*. The switching network 405-*a* may be configured to route data and commands between various interfaces. In some cases, the switching network 405-*a* may include various components (e.g., multiplexers, transistors) to route data and control signals between interfaces. For example, the switching network 405-*a* may route the clock signal 435, the CA 440, or a combination of both from the tester interface 410 to the interface 415 in response to a command, the CE 445, or both. In such an example, a command and the CE 445 may be sent by the tester interface 410 and received by the switching network 405-*a*, and the switching network 405-*a* may subsequently direct the command to the interface 415 and memory devices 430 indicated by the CE 445.

The system 400 may include a data 460 channel and a RE 465 configured to facilitate the transfer of data between the memory devices and the host system. The data 460 may be utilized to transfer data between the tester interface 410 and the interface 415 in response to a command on the CA 440. In the case of a write command, the data 460 may be transferred from the tester interface 410 to the interface 415 and associated memory devices 430 based on the address indicated in the associated command. In the case of a read command, the data 460 may be transferred from the interface 415 and associated memory devices 430 to the tester interface 410 based on the address indicated in the associated command. In the case of a read command, the RE 465 may be used to initiate the read operations and may be active until the transfer of data from the interface 415 and memory devices 430 to the tester interface 410 is completed or terminated.

The system 400 may include the switching network 405-*b*. The switching network 405-*b* may be configured to route data and commands between various interfaces. In some cases, the switching network 405-*b* may include various components (e.g., multiplexers, transistors) to route data and control signals between interfaces. The switching network 405-*b* may be configured to route the RE 465 to the decoder 425-*b* and the interface 415. Additionally, or alternatively, the switching network 405-*b* may be configured to route information across DQ pins either from the tester interface 410 to the interface 415 (e.g., in the case of a write command) or route information across DQ pins from the interface 415 to the tester interface 410 (e.g., in the case of a read command). For example, a write command may be received and the switching network 405-*b* may subsequently route data from the tester interface 410 to the interface 415 and the memory devices 430. In other examples, a read command may be received and the switching network 405-*b* may route data from the interface 415 and memory devices 430 to the tester interface 410.

The system 400 may include one or more components to enable the asynchronous communication of commands relative to the command's associated data. Examples of these components may include a decoder 425-*a*, a buffer 420, and a decoder 425-*b*.

The system 400 may include the buffer 420 to temporarily store data during access operations. The buffer 420 may be an example of a FIFO data structure. For example, the buffer 420 may utilize pointers to determine the location of the start and end of the buffer queue are. In such a case, the buffer 420 may include an enqueue pointer 450 (e.g., a push pointer) that may indicate where a new data item may be stored in the buffer 420. Similarly, the buffer 420 may include a dequeue pointer 455 (e.g., a pop pointer) that may indicate where stored data may be removed from the buffer 420. As such, data may be loaded into the buffer 420 at the location indicated by the enqueue pointer 450, and the same data may be pushed from the buffer 420 at the location indicated by the dequeue pointer 455 before other data is removed from the buffer 420.

The system 400 may include a decoder 425-*a*. The decoder 425-*a* may be coupled with the tester interface 410, the switching network 405-*a*, the interface 415, and the buffer 420. In some examples, the decoder 425-*a* may identify a select chip enable command and transfer data to the buffer 420 based on the header of the command communicated over the CA 440 and the CE 445. For example, the decoder 425-*a* may identify a select chip enable command on the CA 440 channel (as described with reference to FIGS. 3A and 3B). In response to identifying the select chip enable command, the decoder 425-*a* may read an activate command on the CE 445 channel (e.g., a select chip line) and may push the channel select indicator (e.g., indicator of the active memory devices 430) from the CE 445 into the buffer 420 at the location indicated by the enqueue pointer 450. In some examples, the decoder 425-*a* may identify a select chip terminate command and remove data from the buffer 420. For example, the decoder 425-*a* may identify a select chip terminate command on the CA 440 channel, and may read the stored data (e.g., channel indicator) from the buffer 420 at the location indicated by the dequeue pointer 455 in response to identifying the select chip terminate command.

The system 400 may include a decoder 425-*b*. The decoder 425-*b* may be coupled with the tester interface 410, the switching network 405-*b*, the interface 415, and the buffer 420. In some examples, the decoder 425-*b* may detect a read command or a write command. For example, the decoder 425-*b* may detect a read command via the RE 465 signal, in response to routing the data, or a combination of both. Similarly, the decoder 425-*b* may detect data for a write command in response to routing the data via the data 460, or a write command via data on the CE 445 line of the tester interface 410, or a combination of both. In response to detecting the read or write command, the decoder 425-*b* may read data from (e.g., read) the buffer 420 at the location indicated by the dequeue pointer 455. As such, the data may be routed (via the switching network 405-*b*) to the tester interface 410, the interface 415 and associated memory devices 430, or a combination thereof as a result.

The switching networks 405 may facilitate data transfers for both read and write operations. For example, in response to the decoder 425-*b* detecting a write command and reading data from the buffer 420, the switching network 405-*a* may transfer data from the tester interface 410 to the interface 415 and associated memory devices 430. Similarly, in response to the decoder 425-*b* detecting a read command and loading data into the buffer 420, the switching network 405-*b* may transfer data from the interface 415 and associated memory devices 430 to the tester interface 410.

In some examples, the tester interface 410 may initiate a testing procedure. For example, the tester interface 410 may transmit, and the switching network 405-*a* may receive, a command to enable the transfer of data (e.g., a data burst) associated with one or more memory device 430 access operations. The tester interface 410 may transmit the command via GPIO lines coupled with pass-through mode components during the testing procedures, which may bypass a memory controller associated with the memory devices 430. In some examples, the tester interface 410 may transmit the command via the CA 440 lines (in accordance with the clock signal 435). The command may include one or more headers and other information related to the headers (e.g., data output, data input, address, among other information). In some examples, the header may include a select chip enable command. As such, the select chip enable command may activate (e.g., enable) the CE 445 lines.

In response to receiving the command (e.g., the one or more headers, the information) to enable the data burst, the tester interface 410 may send and the decoder 425-*a* may receive a channel select indicator associated with the data via the CE 445, and the decoder 425-*a* may subsequently write the channel select indicator to the buffer 420. For example, the decoder 425-*a* may determine that one or more of the headers of the command includes the select chip enable command and, in response to which, may write the channel select indicator present on the CE 445 to the buffer 420. In this case, the decoder 425-*a* may write the channel select indicator to the location of the buffer 420 pointed to by the enqueue pointer 450. In response to the decoder 425-*a* writing the channel select indicator to the buffer 420, the buffer 420 may increment the enqueue pointer 450 such that it may point to a new location in the buffer 420.

Subsequent to writing the channel select indicator to the buffer 420, the decoder 425-*b* may detect (e.g., via the data 460 channel) the data associated with the memory device 430 access operations, which may initiate the reading of the channel select indicator stored in the buffer 420. For example, based on detecting the data, the decoder 425-*b* may read out the channel select indicator from the location of the buffer 420 indicated by the dequeue pointer 455. In response to reading out the channel select indicator, the decoder 425-*b* may route the data via the data 460 between the tester interface 410, the interface 415, one or more of the memory devices 430, or a combination thereof. In some examples, the channel select indicator may indicate a memory device 430-*a* from the multiple memory devices 430 to which the decoder 425-*b* may route the data. As such, the memory device 430-*a* may perform the access operation associated with the data as a result of receiving the data from the decoder 425-*b*.

In some examples, the access operations and associated data may pertain to read or write operations. In the case that the access operations are read operations, the switching network 405-*a* may detect a read command transmitted from the tester interface 410 after detecting the command (e.g., the header, the information). Detecting the read command may include the decoder 425-*b* detecting a RE 465 signal as a part of or in conjunction with the detected data on the data 460. In the case that the access operations are write operations, the switching network 405-*a* may detect a write command transmitted from the tester interface 410 after detecting the command (e.g., the header, the information). Detecting the write command may include the decoder 425-*b* detecting data on the CE 445 lines of the tester interface 410 as a part of or in conjunction with the detected data on the data 460.

In response to the decoder 425-*b* routing the data, the tester interface 410 may transmit, and the switching network 405-*a* may receive, a second command to terminate the transfer of the data associated with the memory devices 430 access operations. The second command may include one or more headers and other information related to the headers (e.g., data output, data input, address, among other information). In some examples, the header may include a select chip terminate command. As such, the select chip terminate command may prompt the buffer 420 to erase the channel select indicator stored at the location indicated by the dequeue pointer.

In response to receiving the second command (e.g., the one or more headers, the information) including the select chip terminate command, the decoder 425-*a* may erase the channel select indicator from the buffer 240. For example, the decoder 425-*a* may identify a location of the buffer 420 pointed to by the dequeue pointer 455 that may contain the channel select indicator. The decoder 425-*a* may then erase the channel select indicator from the location of the buffer 420 pointed to by the dequeue pointer 455. In response to the decoder 425-*a* erasing the channel select indicator from the buffer 420, the buffer 420 may increment the dequeue pointer 455 such that it may point to a new location in the buffer 420. In some examples, erasing the channel select indicator may include incrementing the dequeue pointer to point to the next stored location. Such an action may free up that location in the buffer to be overwritten by other data when the enqueue pointer is pointed at that location.

Figure 5:
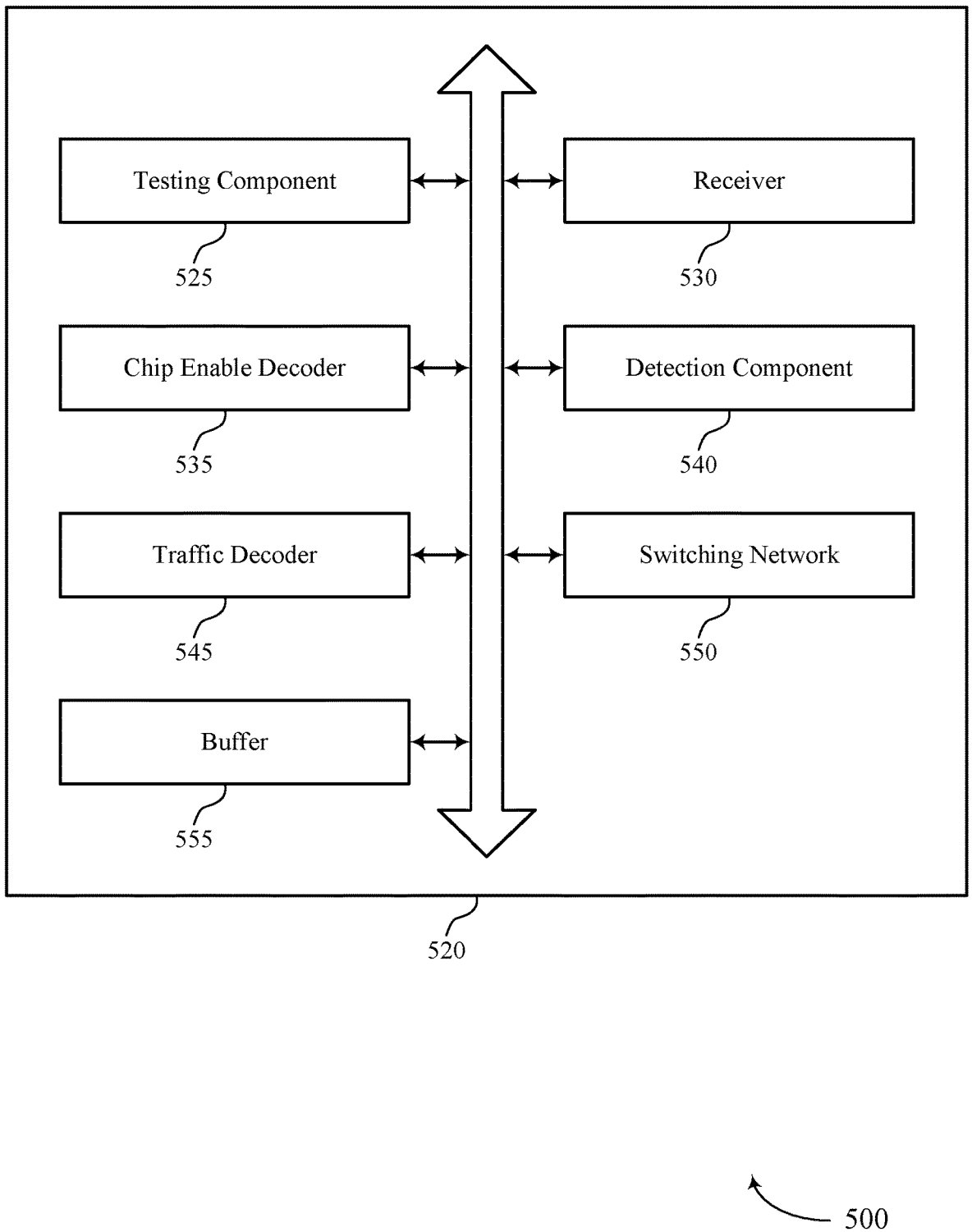
FIG. 5 illustrates an example of a block diagram that supports improved testing for memory devices using dedicated command and address channels in accordance with examples as disclosed herein.

FIG. 5 illustrates a block diagram 500 of a memory system 520 that supports improved testing for memory devices using dedicated command and address channels in accordance with examples as disclosed herein. The memory system 520 may be an example of aspects of a memory system as described with reference to FIGS. 1 through 4. The memory system 520, or various components thereof, may be an example of means for performing various aspects of improved testing for memory devices using dedicated command and address channels as described herein. For example, the memory system 520 may include a testing component 525, a receiver 530, a chip enable decoder 535, a detection component 540, a traffic decoder 545, a switching network 550, a buffer 555, or any combination thereof. Each of these components may communicate, directly or indirectly, with one another (e.g., via one or more buses).

The testing component 525 may be configured as or otherwise support a means for initiating a testing procedure of a memory device. The receiver 530 may be configured as or otherwise support a means for receive a command to enable a data burst associated with an access operation of the memory device based at least in part on initiating the testing procedure. The chip enable decoder 535 may be configured as or otherwise support a means for writing a channel select indicator present on chip enable lines to a buffer based at least in part on receiving the command that enables the data burst, the channel select indicator associated with the data burst. The detection component 540 may be configured as or otherwise support a means for detecting the data burst associated with the access operation after writing the channel select indicator to the buffer. The traffic decoder 545 may be configured as or otherwise support a means for reading the channel select indicator stored in the buffer based at least in part on detecting the data burst. The switching network 550 may be configured as or otherwise support a means for routing the data burst between the memory device and an interface based at least in part on the channel select indicator read from the buffer.

In some examples, the chip enable decoder 535 may be configured as or otherwise support a means for determining that a header of the command indicates that the command includes a select chip enable command, where writing the channel select indicator is based at least in part on determining that the header indicates the command includes the select chip enable command.

In some examples, the switching network 550 may be configured as or otherwise support a means for identifying the memory device from a plurality of memory devices based at least in part on the channel select indicator, where routing the data burst is based at least in part on identifying the memory device.

In some examples, the receiver 530 may be configured as or otherwise support a means for receiving a second command to terminate the data burst based at least in part on routing the data burst. In some examples, the buffer 555 may be configured as or otherwise support a means for erasing the channel select indicator from the buffer based at least in part on receiving the second command.

In some examples, the traffic decoder 545 may be configured as or otherwise support a means for identifying a location of the buffer indicated by an dequeue pointer of the buffer based at least in part on receiving the second command, where the channel select indicator is erased from the location indicated by the dequeue pointer.

In some examples, the buffer 555 may be configured as or otherwise support a means for incrementing the dequeue pointer based at least in part on erasing the channel select indicator from the location.

In some examples, the chip enable decoder 535 may be configured as or otherwise support a means for determining that a header of the second command indicates that the second command includes a select chip terminate command, where erasing the channel select indicator is based at least in part on determining that the header indicates the second command includes the select chip terminate command.

In some examples, the chip enable decoder 535 may be configured as or otherwise support a means for identifying a location of the buffer indicated by an enqueue pointer of the buffer based at least in part on receiving the command, where the channel select indicator is written to the location indicated by the enqueue pointer.

In some examples, the buffer 555 may be configured as or otherwise support a means for incrementing the enqueue pointer based at least in part on writing the channel select indicator to the location.

In some examples, the traffic decoder 545 may be configured as or otherwise support a means for identifying a location of the buffer indicated by an dequeue pointer of the buffer based at least in part on detecting the data burst, where the channel select indicator is read from the location indicated by the dequeue pointer.

In some examples, the receiver 530 may be configured as or otherwise support a means for receiving a write command to write data to the memory device, where receiving the command is received after receiving the write command; and where detecting the data burst further includes detecting data on input/output lines of the interface.

In some examples, the receiver 530 may be configured as or otherwise support a means for receiving a read command to read data from the memory device, where receiving the command is received after receiving the read command; and where detecting the data burst further includes receiving a read enable signal.

In some examples, the chip enable decoder 535 may be configured as or otherwise support a means for receiving the channel select indicator over the chip enable lines, where writing the channel select indicator is based at least in part on receiving the channel select indicator.

In some examples, the switching network 550 may be configured as or otherwise support a means for performing the access operation using the data burst based at least in part on routing the data burst.

In some examples, the receiver 530 may be configured as or otherwise support a means for receiving, from a testing system coupled with the interface, a second command to initiate the testing procedure, where initiating the testing procedure is based at least in part on receiving the command.

In some examples, the command is received over a plurality of input/output lines of an open NAND flash interface that are dedicated for command and address information as part of normal procedures. In some examples, the command is received over a plurality of general purpose input/output lines coupled with pass-through mode components as part of the testing procedure.

In some examples, pass-through mode components associated with the memory device are used to perform the testing procedure, the pass-through mode components bypass a memory controller associated with the memory device.

In some examples, the interface includes configured to couple with a testing system or a host system. In some examples, the buffer includes a first-in, first-out data structure. In some examples, the memory device includes a non-volatile memory device.

Figure 6:
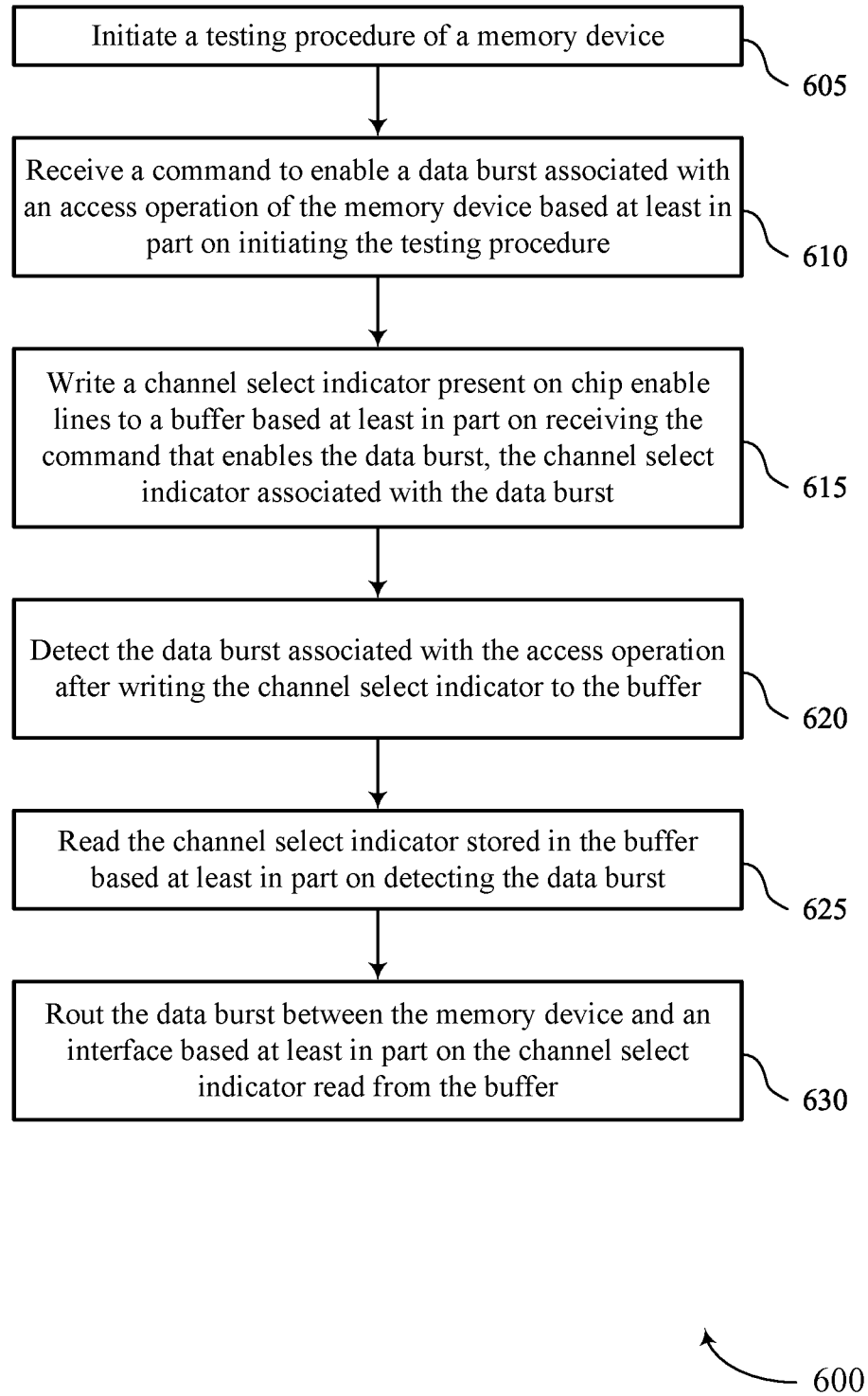
FIG. 6 illustrates an example of a flow chart that supports improved testing for memory devices using dedicated command and address channels in accordance with examples as disclosed herein.

FIG. 6 illustrates a flowchart showing a method 600 that supports improved testing for memory devices using dedicated command and address channels in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include initiating a testing procedure of a memory device. The operations of 605 may be performed in accordance with examples as disclosed herein. In some examples, aspects of the operations of 605 may be performed by a testing component 525 as described with reference to FIG. 5.

At 610, the method may include receive a command to enable a data burst associated with an access operation of the memory device based at least in part on initiating the testing procedure. The operations of 610 may be performed in accordance with examples as disclosed herein. In some examples, aspects of the operations of 610 may be performed by a receiver 530 as described with reference to FIG. 5.

At 615, the method may include writing a channel select indicator present on chip enable lines to a buffer based at least in part on receiving the command that enables the data burst, the channel select indicator associated with the data burst. The operations of 615 may be performed in accordance with examples as disclosed herein. In some examples, aspects of the operations of 615 may be performed by a chip enable decoder 535 as described with reference to FIG. 5.

At 620, the method may include detecting the data burst associated with the access operation after writing the channel select indicator to the buffer. The operations of 620 may be performed in accordance with examples as disclosed herein. In some examples, aspects of the operations of 620 may be performed by a detection component 540 as described with reference to FIG. 5.

At 625, the method may include reading the channel select indicator stored in the buffer based at least in part on detecting the data burst. The operations of 625 may be performed in accordance with examples as disclosed herein. In some examples, aspects of the operations of 625 may be performed by a traffic decoder 545 as described with reference to FIG. 5.

At 630, the method may include routing the data burst between the memory device and an interface based at least in part on the channel select indicator read from the buffer. The operations of 630 may be performed in accordance with examples as disclosed herein. In some examples, aspects of the operations of 630 may be performed by a switching network 550 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initiating a testing procedure of a memory device; receive a command to enable a data burst associated with an access operation of the memory device based at least in part on initiating the testing procedure; writing a channel select indicator present on chip enable lines to a buffer based at least in part on receiving the command that enables the data burst, the channel select indicator associated with the data burst; detecting the data burst associated with the access operation after writing the channel select indicator to the buffer; reading the channel select indicator stored in the buffer based at least in part on detecting the data burst; and routing the data burst between the memory device and an interface based at least in part on the channel select indicator read from the buffer.

Aspect 2: The method, apparatus, or non-transitory computer-readable medium of aspect 1, further including operations, features, circuitry, logic, means, or instructions, or any combination thereof for determining that a header of the command indicates that the command includes a select chip enable command, where writing the channel select indicator is based at least in part on determining that the header indicates the command includes the select chip enable command.

Aspect 3: The method, apparatus, or non-transitory computer-readable medium of any of aspects 1 through 2, further including operations, features, circuitry, logic, means, or instructions, or any combination thereof for identifying the memory device from a plurality of memory devices based at least in part on the channel select indicator, where routing the data burst is based at least in part on identifying the memory device.

Aspect 4: The method, apparatus, or non-transitory computer-readable medium of any of aspects 1 through 3, further including operations, features, circuitry, logic, means, or instructions, or any combination thereof for receiving a second command to terminate the data burst based at least in part on routing the data burst and erasing the channel select indicator from the buffer based at least in part on receiving the second command.

Aspect 5: The method, apparatus, or non-transitory computer-readable medium of aspect 4, further including operations, features, circuitry, logic, means, or instructions, or any combination thereof for identifying a location of the buffer indicated by an dequeue pointer of the buffer based at least in part on receiving the second command, where the channel select indicator is erased from the location indicated by the dequeue pointer.

Aspect 6: The method, apparatus, or non-transitory computer-readable medium of aspect 5, further including operations, features, circuitry, logic, means, or instructions, or any combination thereof for incrementing the dequeue pointer based at least in part on erasing the channel select indicator from the location.

Aspect 7: The method, apparatus, or non-transitory computer-readable medium of any of aspects 4 through 6, further including operations, features, circuitry, logic, means, or instructions, or any combination thereof for determining that a header of the second command indicates that the second command includes a select chip terminate command, where erasing the channel select indicator is based at least in part on determining that the header indicates the second command includes the select chip terminate command.

Aspect 8: The method, apparatus, or non-transitory computer-readable medium of any of aspects 1 through 7, further including operations, features, circuitry, logic, means, or instructions, or any combination thereof for identifying a location of the buffer indicated by an enqueue pointer of the buffer based at least in part on receiving the command, where the channel select indicator is written to the location indicated by the enqueue pointer.

Aspect 9: The method, apparatus, or non-transitory computer-readable medium of aspect 8, further including operations, features, circuitry, logic, means, or instructions, or any combination thereof for incrementing the enqueue pointer based at least in part on writing the channel select indicator to the location.

Aspect 10: The method, apparatus, or non-transitory computer-readable medium of any of aspects 1 through 9, further including operations, features, circuitry, logic, means, or instructions, or any combination thereof for identifying a location of the buffer indicated by an dequeue pointer of the buffer based at least in part on detecting the data burst, where the channel select indicator is read from the location indicated by the dequeue pointer.

Aspect 11: The method, apparatus, or non-transitory computer-readable medium of any of aspects 1 through 10, further including operations, features, circuitry, logic, means, or instructions, or any combination thereof for receiving a write command to write data to the memory device, where receiving the command is received after receiving the write command; and where detecting the data burst further includes detecting data on input/output lines of the interface.

Aspect 12: The method, apparatus, or non-transitory computer-readable medium of any of aspects 1 through 11, further including operations, features, circuitry, logic, means, or instructions, or any combination thereof for receiving a read command to read data from the memory device, where receiving the command is received after receiving the read command; and where detecting the data burst further includes receiving a read enable signal.

Aspect 13: The method, apparatus, or non-transitory computer-readable medium of any of aspects 1 through 12, further including operations, features, circuitry, logic, means, or instructions, or any combination thereof for receiving the channel select indicator over the chip enable lines, where writing the channel select indicator is based at least in part on receiving the channel select indicator.

Aspect 14: The method, apparatus, or non-transitory computer-readable medium of any of aspects 1 through 13, further including operations, features, circuitry, logic, means, or instructions, or any combination thereof for performing the access operation using the data burst based at least in part on routing the data burst.

Aspect 15: The method, apparatus, or non-transitory computer-readable medium of any of aspects 1 through 14, further including operations, features, circuitry, logic, means, or instructions, or any combination thereof for receiving, from a testing system coupled with the interface, a second command to initiate the testing procedure, where initiating the testing procedure is based at least in part on receiving the command.

Aspect 16: The method, apparatus, or non-transitory computer-readable medium of any of aspects 1 through 15, where the command is received over a plurality of input/output lines of an open NAND flash interface that are dedicated for command and address information as part of normal procedures and the command is received over a plurality of general purpose input/output lines coupled with pass-through mode components as part of the testing procedure.

Aspect 17: The method, apparatus, or non-transitory computer-readable medium of any of aspects 1 through 16, where pass-through mode components associated with the memory device are used to perform the testing procedure, the pass-through mode components bypass a memory controller associated with the memory device.

Aspect 18: The method, apparatus, or non-transitory computer-readable medium of any of aspects 1 through 17, where the interface includes configured to couple with a testing system or a host system.

Aspect 19: The method, apparatus, or non-transitory computer-readable medium of any of aspects 1 through 18, where the buffer includes a first-in, first-out data structure.

Aspect 20: The method, apparatus, or non-transitory computer-readable medium of any of aspects 1 through 19, where the memory device includes a non-volatile memory device.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (e.g., majority carriers are electrons), then the FET may be referred to as an n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a controller associated with a memory device, wherein the controller is configured to cause the apparatus to:
   initiate a testing procedure of the memory device;
   receive a first command to perform an access operation at the memory device based at least in part on initiating the testing procedure;

write a channel select indicator present on chip enable lines to a buffer based at least in part on receiving the first command to perform the access operation, the channel select indicator associated with the access operation;

detect a data burst associated with the access operation after writing the channel select indicator to the buffer;

read the channel select indicator stored in the buffer based at least in part on detecting the data burst; and route the data burst between the memory device and an interface based at least in part on the channel select indicator read from the buffer.

2. The apparatus of claim 1, wherein the controller is further configured to cause the apparatus to:

determine that a header of the first command indicates that the first command comprises a select chip enable command, wherein writing the channel select indicator is based at least in part on determining that the header indicates the first command comprises the select chip enable command.

3. The apparatus of claim 1, wherein the controller is further configured to cause the apparatus to:

identify the memory device from a plurality of memory devices based at least in part on the channel select indicator, wherein routing the data burst is based at least in part on identifying the memory device.

4. The apparatus of claim 1, wherein the controller is further configured to cause the apparatus to:

receive a second command to terminate the data burst based at least in part on routing the data burst; and erase the channel select indicator from the buffer based at least in part on receiving the second command.

5. The apparatus of claim 4, wherein the controller is further configured to cause the apparatus to:

identify a location of the buffer indicated by an dequeue pointer of the buffer based at least in part on receiving the second command, wherein the channel select indicator is erased from the location indicated by the dequeue pointer.

6. The apparatus of claim 5, wherein the controller is further configured to cause the apparatus to:

increment the dequeue pointer based at least in part on erasing the channel select indicator from the location.

7. The apparatus of claim 4, wherein the controller is further configured to cause the apparatus to:

determine that a header of the second command indicates that the second command comprises a select chip terminate command, wherein erasing the channel select indicator is based at least in part on determining that the header indicates the second command comprises the select chip terminate command.

8. The apparatus of claim 1, wherein the controller is further configured to cause the apparatus to:

identify a location of the buffer indicated by an enqueue pointer of the buffer based at least in part on receiving the first command, wherein the channel select indicator is written to the location indicated by the enqueue pointer.

9. The apparatus of claim 8, wherein the controller is further configured to cause the apparatus to:

increment the enqueue pointer based at least in part on writing the channel select indicator to the location.

10. The apparatus of claim 1, wherein the controller is further configured to cause the apparatus to:

identify a location of the buffer indicated by an dequeue pointer of the buffer based at least in part on detecting the data burst, wherein the channel select indicator is read from the location indicated by the dequeue pointer.

11. The apparatus of claim 1, wherein the controller is further configured to cause the apparatus to:

receive a write command to write data to the memory device, wherein receiving the first command is received after receiving the write command; and wherein detecting the data burst further comprises detecting data on input/output lines of the interface.

12. The apparatus of claim 1, wherein the controller is further configured to cause the apparatus to:

receive a read command to read data from the memory device, wherein receiving the first command is received after receiving the read command; and wherein detecting the data burst further comprises receiving a read enable signal.

13. The apparatus of claim 1, wherein the controller is further configured to cause the apparatus to:

receive the channel select indicator over the chip enable lines, wherein writing the channel select indicator is based at least in part on receiving the channel select indicator.

14. The apparatus of claim 1, wherein the controller is further configured to cause the apparatus to:

perform the access operation using the data burst based at least in part on routing the data burst.

15. The apparatus of claim 1, wherein the controller is further configured to cause the apparatus to:

receive, from a testing system coupled with the interface, a second command to initiate the testing procedure, wherein initiating the testing procedure is based at least in part on receiving the first command.

16. The apparatus of claim 1, wherein:

the first command is received over a plurality of input/output lines of an open NAND flash interface that are dedicated for command and address information as part of normal procedures, and the first command is received over a plurality of general purpose input/output lines coupled with pass-through mode components as part of the testing procedure.

17. The apparatus of claim 1, wherein pass-through mode components associated with the memory device are used to perform the testing procedure, the pass-through mode components bypass a memory controller associated with the memory device.

18. The apparatus of claim 1, wherein:

the interface comprises configured to couple with a testing system or a host system.

19. A non-transitory computer-readable medium storing code, the code comprising instructions executable by a processor to:

initiate a testing procedure of a memory device;

receive a first command to perform an access operation at the memory device based at least in part on initiating the testing procedure;

write a channel select indicator present on chip enable lines to a buffer based at least in part on receiving the first command to perform the access operation, the channel select indicator associated with the access operation;

detect a data burst associated with the access operation after writing the channel select indicator to the buffer;

read the channel select indicator stored in the buffer based at least in part on detecting the data burst; and route the data burst between the memory device and an interface based at least in part on the channel select indicator read from the buffer.

20. A method, comprising:

initiating a testing procedure of a memory device;

receiving a first command to perform an access operation at the memory device based at least in part on initiating the testing procedure;

writing a channel select indicator present on chip enable lines to a buffer based at least in part on receiving the first command to perform the access operation, the channel select indicator associated with the access operation;

detecting a data burst associated with the access operation after writing the channel select indicator to the buffer;

reading the channel select indicator stored in the buffer based at least in part on detecting the data burst; and routing the data burst between the memory device and an interface based at least in part on the channel select indicator read from the buffer.

* * * * *